United States Patent [19]

Harduvel

[11] 4,125,799
[45] Nov. 14, 1978

[54] GYRO CAGING LOOP SYSTEM

[75] Inventor: John T. Harduvel, Huntington Beach, Calif.

[73] Assignee: McDonnell Douglas Corporation, Long Beach, Calif.

[21] Appl. No.: 820,219

[22] Filed: Jul. 29, 1977

[51] Int. Cl.² ............................................. G05B 6/02
[52] U.S. Cl. .................................. 318/621; 318/649; 74/5.4
[58] Field of Search ............. 318/620, 621, 622, 649, 318/580; 74/5.4

[56] References Cited

U.S. PATENT DOCUMENTS

| | | | |
|---|---|---|---|
| 3,227,935 | 1/1966 | Kawada | 318/620 X |
| 3,398,341 | 8/1968 | Dooley et al. | 318/621 X |
| 3,808,486 | 4/1974 | Cuda et al. | 318/620 |
| 3,986,092 | 10/1976 | Tijsma et al. | 318/649 |
| 4,052,654 | 10/1977 | Kramer | 318/649 |

Primary Examiner—B. Dobeck
Attorney, Agent, or Firm—Henry M. Bissell

[57] ABSTRACT

A system for providing a stable caging loop for two-degree-of-freedom dry tuned gyros used in a strapdown inertial navigation system. The system provides satisfactory noise rejection and good navigation accuracy using cross axis torquing only with extremely simple analog shaping circuits in place of the combination of cross axis and direct axis torquing with complex shaping circuitry that is normally required with these gyros in such an application. A 64 Hz bandwidth loop is provided with less than 1° phase lag below 5 Hz, 10 db attenuation of rotor spin rate noise, and at least 35 db attenuation of all higher frequencies. Its performance is such that it can be used in a navigation system requiring accuracy on the order of one nautical mile per hour in a typical missile environment.

14 Claims, 6 Drawing Figures

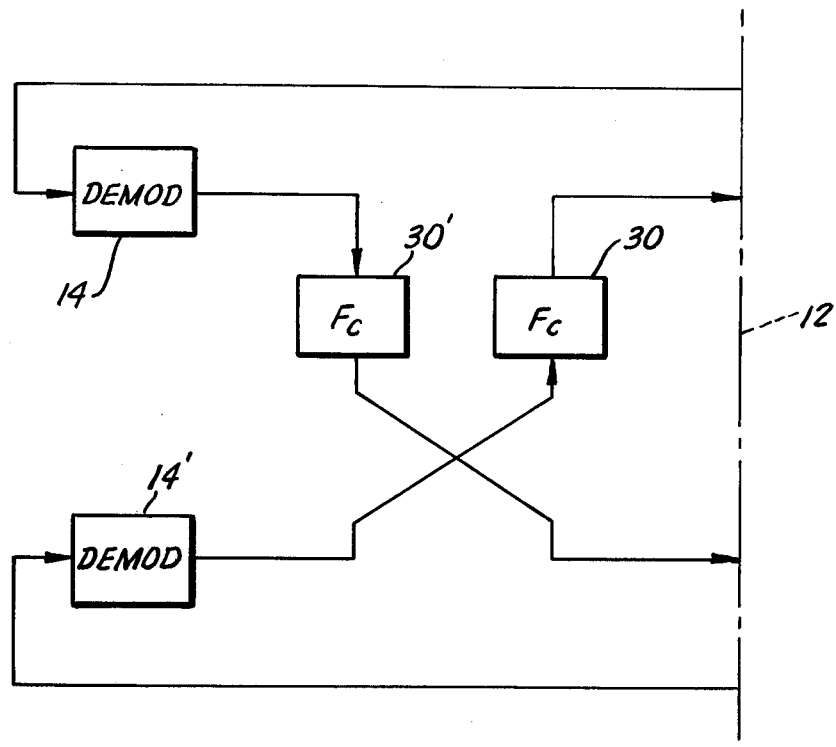
FIG_2
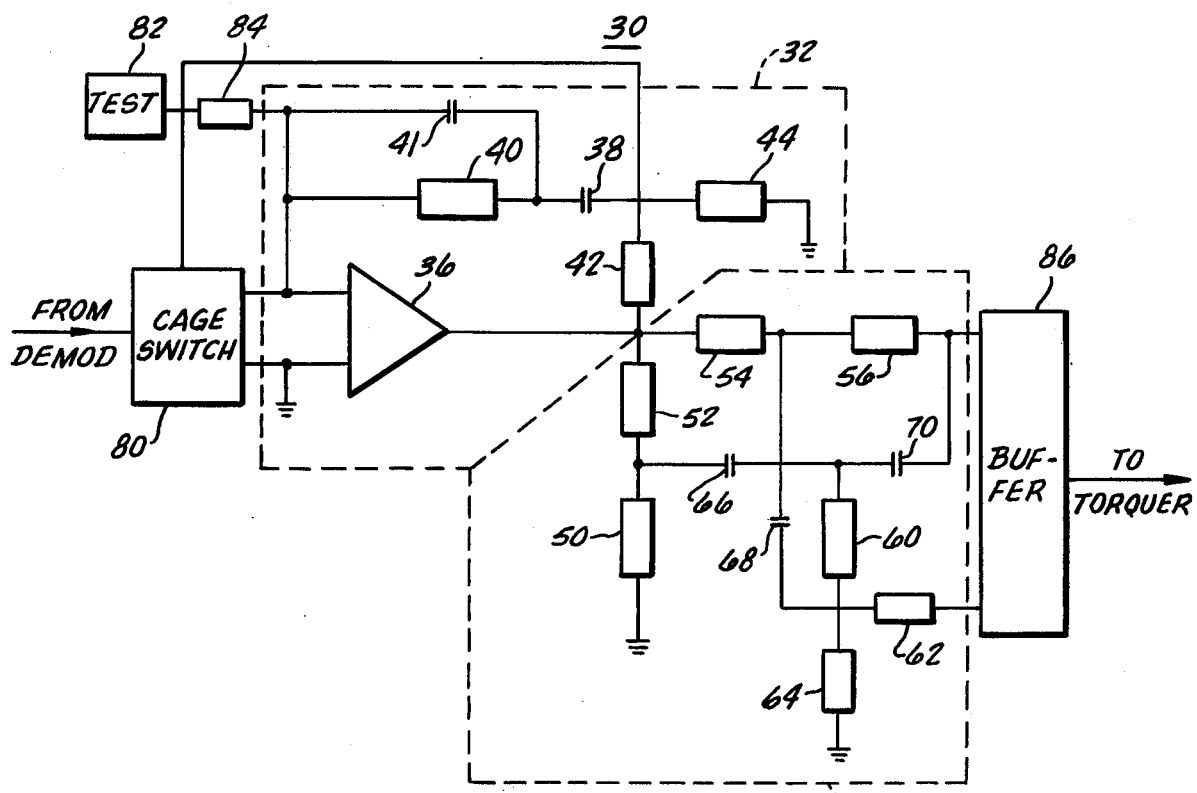
FIG_3

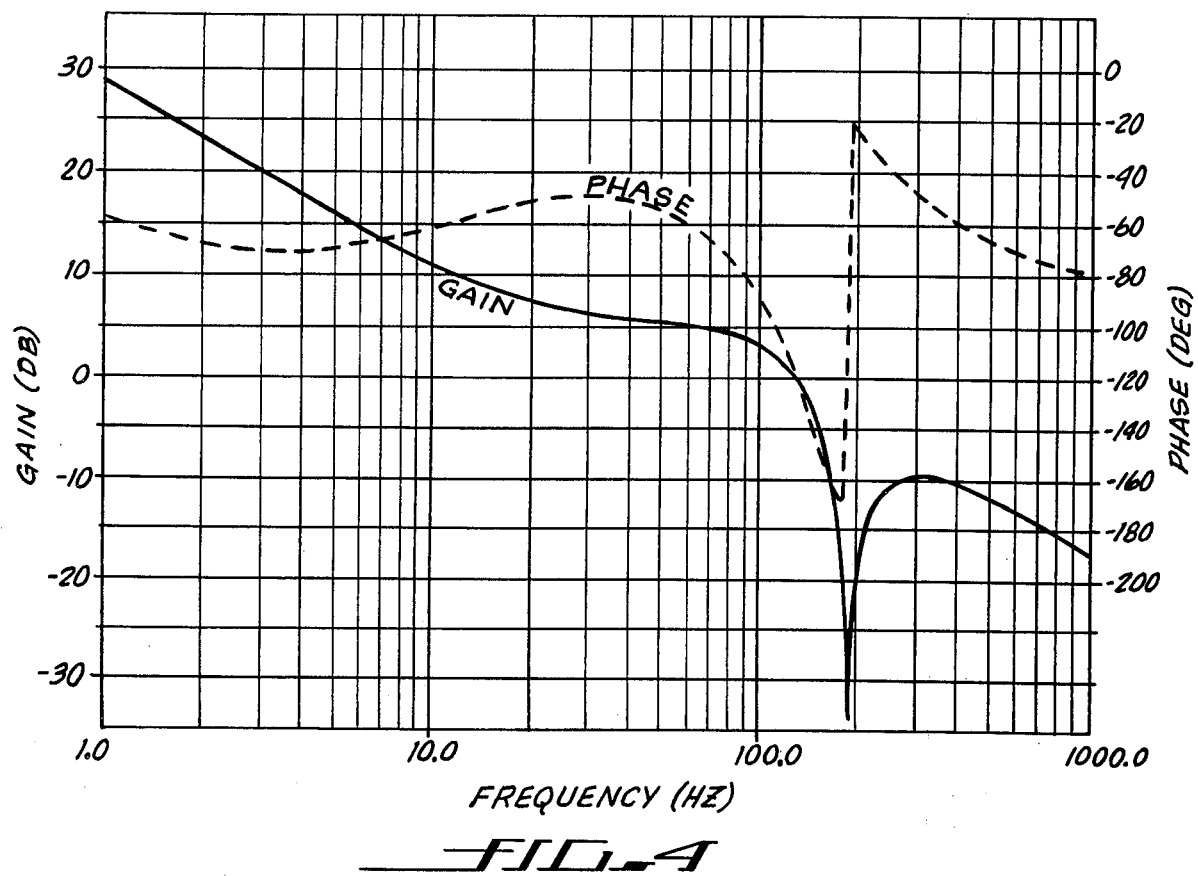
_FIG_4
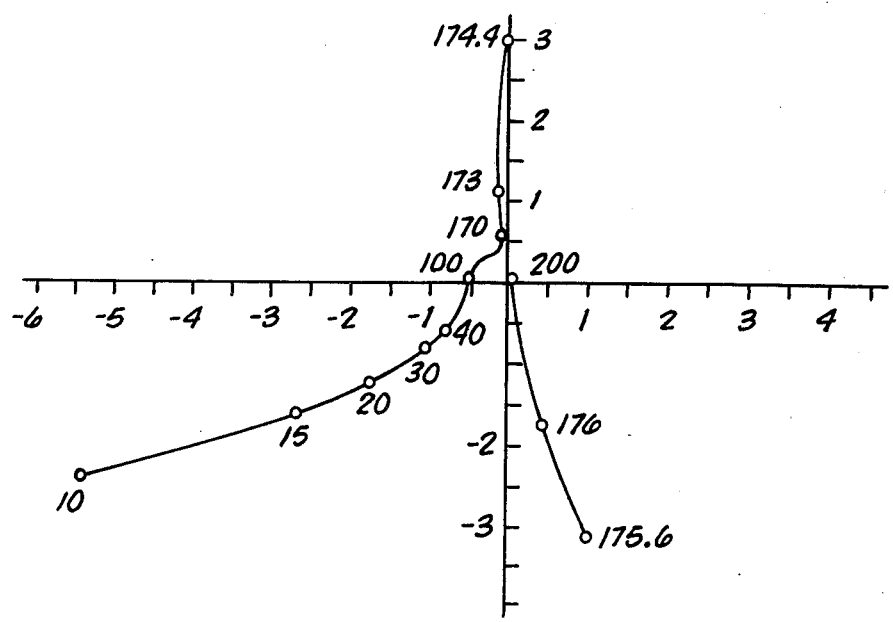
_FIG_5

GYRO CAGING LOOP SYSTEM

BACKGROUND OF THE INVENTION

1. Field of the Invention

This invention relates to gyroscopes (gyros) employed in inertial navigation systems, and more particularly to gyro stabilizing control circuitry adapted for particular two-degree-of-freedom dry tuned gyros used in strap-down navigation systems.

2. Description of the Prior Art

In the usual stable-platform inertial navigation system prior to departure of the vehicle from a known location and attitude, as when a space vehicle is on the ground awaiting launching, it is desirable to preserve the orientation of the gyro axes relative to the earth. For this reason, the gyros are electrically caged and the case of each gyro is also caged in order to constrain both the gyro and the accelerometer to a predetermined orientation relative to the earth which can be measured by suitable means relative to a fixed base line on the ground. At launching, the system is uncaged by freeing both gyro and case so that thereafter the gyro will preserve its initial spatial orientation irrespective of any maneuvers of the vehicle. The caging of the gyros is effected by means of electrical switches which are thrown at launch.

In a strap-down inertial navigation system, on the other hand, the inertial sensors, both rotational and translational, are secured to the air frame base. Both angular and translational data are processed in a high-speed guidance computer to continually update both rotational and translational references. The inertial references are stored analytically in a flight (or guidance) computer. The gyros are continually caged throughout the operation of the system. The only time the gyros of a strap-down navigation system are uncaged is when they are being spun up to synchronous operating speed. At such time, the switches completing the gyro caging loop are opened, but at all other times during operation of the system, the gyros are caged by means of an electrical caging loop.

The recently introduced two-degree-of-freedom dry tuned gyro (such as the Teledyne Model SDG-5) provides distinct advantages in inertial navigation systems as contrasted with previously known conventional gyros. By suitable orientation of three such units, complete redundancy can be provided. The disadvantage with such two-degree-of-freedom dry tuned gyro systems, when used for strap-down applications of relatively high bandwidth, is that the gyros normally require both cross axis and direct axis torquing together with complex shaping circuitry to provide a stable caging loop and achieve satisfactory noise rejection and good navigation accuracy.

SUMMARY OF THE INVENTION

In brief, arrangements in accordance with the present invention comprise a dual caging loop for a two-axis gyro system using the two-degree-of-freedom dry tuned gyros mentioned above. The gyro is caged using the cross feed paths only. Loop shaping occurs within the cross feed networks which comprise an integrator to provide a very stiff loop at low frequencies and to drive rotor pickoff angles to zero in steady state, a lead network to provide the required 40 Hz phase margin and closed loop damping of the dominant poles, a complex lag network to provide phase stabilization of the 175 Hz gyro nutation frequency, and a pair of underdamped complex zeros at 185 Hz to attenuate both the nutation resonance and any 2N (200 Hz—double the rotor spin rate) noise in the loop.

BRIEF DESCRIPTION OF THE DRAWING

A better understanding of the present invention may be had from a consideration of the following detailed description, taken in conjunction with the accompanying drawing, in which:

FIG. 2 is a block diagram corresponding to a portion of FIG. 1, illustrating the simplification achieved in the gyro caging loop of the present invention;

FIG. 3 is a combination block and schematic diagram showing circuit details of a portion of FIG. 2;

FIG. 4 is a Bode plot showing the open loop transfer function operation of circuitry of the present invention;

FIG. 5 is a Nyquist diagram showing the open loop performance of circuitry of the present invention.

Description of the Preferred Embodiment

The Teledyne Model SDG-5 two-degree-of-freedom dry tuned gyro, for which the caging loop system of the present invention is specifically designed, has the following parameters:

| | |
|---|---|
| ANGULAR MOMENTUM, H | $= 1.007 \times 10^6$ GM-CM$^2$/SEC |
| ROTOR SPIN INERTIA, C | $= 1603$ GM-CM$^2$ |
| ROTOR TRANSVERSE INERTIA, A | $= 916$ GM-CM$^2$ |
| SPIN SPEED, N | $= 100$ HZ |
| NUTATION FREQUENCY, $\omega_N$ | $= 175$ HZ |
| NUTATION DAMPING RATIO, $\zeta_N$ | $= .0005$ |
| ROTOR DYNAMICS, R | $= \dfrac{1}{A(S^2 + 2\zeta_N(2\pi)\omega_N S + (4\pi^2)\omega_N^2)}$ RAD/DYNE-CM |
| ROTOR FREEDOM | $= \pm 0.5$ DEG. |
| TORQUER TRANSFER FUNCTION, T | $= \dfrac{2.115 \times 10^9}{S + 14100}$ |
| PICKOFF SCALE FACTOR, Kp | $= 100$ V$_{RMS}$/RAD |

Figure 1:
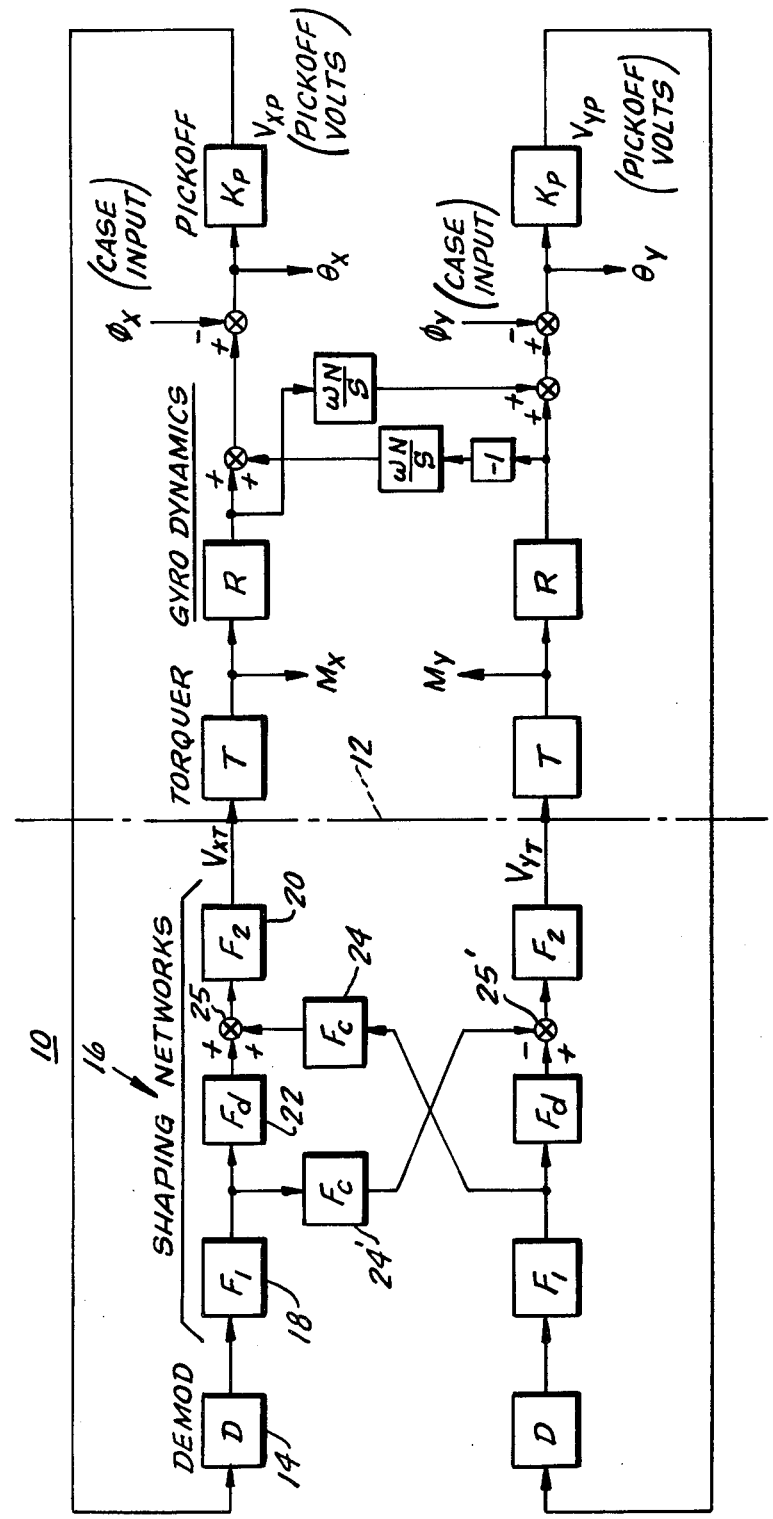
FIG. 1 is a block diagram illustrating, in mathematical model form, a conventional two-axis gyro and associated caging loop system.

FIG. 1 illustrates in block diagram form a conventional caging loop system 10 for use with two-axis or two-degree-of-freedom gyros, such as the Teldyne SDG-5 referenced above. The gyro itself is represented by the portion of FIG. 1 to the right of the vertical broken line 12 near the center of FIG. 1. The upper and lower portion of FIG. 1 represent the two distinct axes of the gyro.

To the left of the vertical broken line 10 is the caging loop system which, in the conventional system of FIG. 1 is shown as including a demodulator stage 14 and shaping networks 16 for each of the two upper and lower gyro axes. The shaping networks 16 are shown as comprising an input network 18 an output network 20 and a direct feed network 22. In addition, the upper shaping network 16 includes a cross feed network 24 and a summing point 25 for introducing a portion of the signal from the lower axis gyro loop and in turn provides a signal via a cross feed network 24' and summing point 25' to the lower axis caging loop. In the arrangement of FIG. 1, a pickoff signal is derived from the gyro and applied to the demodulator 14, which is essentially a synchronous switch. A signal from the demodulator 14 is processed in the shaping networks 16 where it is combined with a signal derived from the other gyro axis and ultimately provided as a driving signal voltage for the torquer within the gyro.

While it has been possible to dispense with the direct feed networks shown in FIG. 1 in prior art caging loops of very limited bandwidth, it has been necessary heretofore in systems employing the two-axis dry tuned gyro in strap-down applications of relatively high bandwidth to utilize a circuit corresponding to FIG. 1. Such a utilization has required both cross axis and direct axis torquing and associated complex shaping circuitry to provide a stable caging loop, achieve satisfactory noise rejection, and obtain good navigation accuracy. Arrangements in accordance with the present invention for the first time using the Teledyne SDG-5 two-axis dry tuned gyro in a strap-down navigation system of high bandwidth, achieve the performance of the arrangement of FIG. 1 while using cross axis torquing only and extremely simple analog shaping circuitry.

FIG. 2 is a block diagram showing the cross feed networks 30, 30' of the present invention which are the only shaping networks required in the caging loop system for the gyro. FIG. 2 is to be contrasted with the portion of FIG. 1 to the left of the vertical broken line and illustrates the extreme simplicity of the circuit shown in FIG. 1. The direct feed network 22 and the summing point 25 are entirely eliminated. In addition, the input and output shaping networks 18, 20 are no longer required as separate blocks but may be combined in the cross feed networks 30, 30' of FIG. 2.

The specific circuitry comprising a single cross feed network 30 of FIG. 2 is shown in detail in FIG. 3 as principally comprising an integrator with a lead-lag network within the broken outline box 32 and a complex lag or notch network within the broken outline block 34. The block 32 comprises an operational amplifier 36, an integrating capacitor 38 and a lead-lag network comprising the resistor 40 and capacitor 41 to provide desired phase lead by developing a zero at a lower frequency than a pole.

The complex lag network or notch network of the block 34 comprises resistors 50, 52, 54, 56, 60, 62 and 64 and capacitors 66, 68 and 70 interconnected as shown.

Systems of the type shown in FIG. 3, when formulated mathematically, lead to ordinary integrodifferential or difference equations. The engineering approach to handling such equations is materially simplified by the use of Laplace transforms. This affords the engineer an effective and reliable method which avoids the need for using inverse Laplace-transformation integrals and their evaluation by integration in the complex plane. A generalized second order transfer function for the notch network 34 providing a pair of complex zeros that are underdamped over a pair of poles (i.e. a second order over a second order) is as follows:

$$\frac{S^2 + 2\zeta_z\omega_z S + \omega_z^2}{S^2 + 2\zeta_p\omega_p S + \omega_p^2} \quad (1)$$

The Bode plot of FIG. 4 shows the performance of the open loop circuit of FIG. 3 and is developed by applying a signal of varying frequency at the input while measuring the gain and phase at the output.

The open loop transfer function as expressed above may be utilized in determining the stability of the loop. Stability is analyzed by using Nyquist diagrams, such as that shown in FIG. 5. Using Nyquist theory, in order for a system to be stable, the Nyquist plot in this case must avoid going through or enclosing the −1 point on the horizontal axis. In the circuit of FIG. 3, this requires the development of a phase lead at low frequency in order to develop a phase margin so that the loop is stable. The more phase margin which is provided, the better the closed loop damping of the dominant poles achieved in the system.

In the plot shown in FIG. 5, the numbers along the line beginning in the lower left-hand section (10, 15, 20, 30, etc.) are frequencies in Hertz. These continue increasing along the line approaching the vertical axis to the frequency 174.4 Hz at the top of the plot. The curve continues off the plot, essentially as a circle, and enters the plot of FIG. 5 again near the bottom at the frequency 175.6 Hertz. The plot then contines to the frequency 200 Hz at the origin. The lower frequency portion of the plot in FIG. 5 (below approximately 100 Hz) is brought down and away from the −1 point by the lead-lag network in the integrator block 32 of FIG. 3. The complex lag network of block 34 is then employed to shift the plot around by approximately 180° so as to phase stabilize the nutation resonance of the gyro.

The circuit of FIG. 3 has the following values for the various components:

| Resistors (in ohms) | | Capacitors (in microfarads) | |
| --- | --- | --- | --- |
| R40 | 261K | C38 | .033 |
| R42 | 1K | C41 | .0056 |
| R44 | 1K | C66 | .01 |
| R50 | 6.81K | C68 | .01 |
| R52 | 3.4K | C70 | .01 |
| R54 | 150K | | |
| R56 | 150K | | |
| R60 | 35.7K | | |
| R62 | 523 | | |
| R64 | 2.61K | | |

The operational amplifier 36 is of the Bi-FET type available commercially from National Semiconductor, Fairchild Semiconductor, and others.

The balance of the circuitry shown in FIG. 3 includes a cage switch 80, a test signal source 82 with associated feed resistor 84, and an output buffer stage 86. The cage switch 80 is for uncaging the gyro during spin-up; at all other times, the gyros are caged and the cage switch 80 is closed. The test signal source 82 is for the purpose of providing an electrical stimulus input which is equivalent to physically moving the gyro. The resistors 42 and 44 are principally included to limit the voltage applied to active elements in the circuit to a safe value when the cage switch 80 is opened.

With the values of components as set forth hereinabove in the cross feed shaping network of FIG. 3, the transfer function of the network 30 may be expressed as follows:

$$F_c = \frac{125(1+S/2\pi(15.8))[1+2(.01)S/2\pi(185)+S^2/4\pi^2(185)^2]}{S(1+S/2\pi(108.9))[1+2(.35)S/2\pi(150)+S^2/4\pi^2(150)^2]} \ V/V$$

In equation (2), the portions in brackets represent the complex lag network 34 of FIG. 3, while the portion to the left of the bracketed sections represents the integrator and lead-lag network 32. The numbers in parentheses represent frequencies expressed in Hertz. Thus, the lead-lag network develops a zero at 15.8 Hz and a pole at 108.9 Hz. The number 125 at the beginning of the transfer function represents the DC gain of the circuit. The integrator is represented by the letter S at the beginning of the denominator of the function.

The lag or notch network 34 provides a pair of complex zeros at 185 Hz and a pair of complex poles at 150 Hz. The effect of this may be appreciated by reference to the Bode plot of FIG. 4 which shows the open loop transfer function for the circuit of FIG. 3 in the frequency range of interest. There is a pronounced phase lead in the vicinity of the zero at 15.8 Hz followed by substantial phase lag at the single pole at 108.9 Hz. At the location of the complex poles (150 Hz) there is a further lag in phase and the gain is rolling off substantially from its slope below 100 Hz. Phase is lagging by nearly 180° at the nutation resonance frequency of 175 Hz. This phase lag and the reduction in gain at the nutation frequency provide the desired stabilization at nutation resonance. The deep notch is provided by the complex zeros of the network at 185 Hz. This effectively makes the circle, discussed with reference to the Nyquist diagram of FIG. 5, substantially smaller, also contributing to the stability of the network at the nutation resonance frequency of 175 Hz. Another factor in the design of the notch network to provide the notch at 185 Hz relates to a phenomenon encountered in this particular gyro. Within the gyro, 2N (200 Hz) moments on the gyro rotor rectify to net D.C. moment on the rotor. It is therefore essential not to let any signals get through the torquer loop at 200 Hz. The notch at 185 Hz minimizes the effect of this phenomenon.

Figure 6:
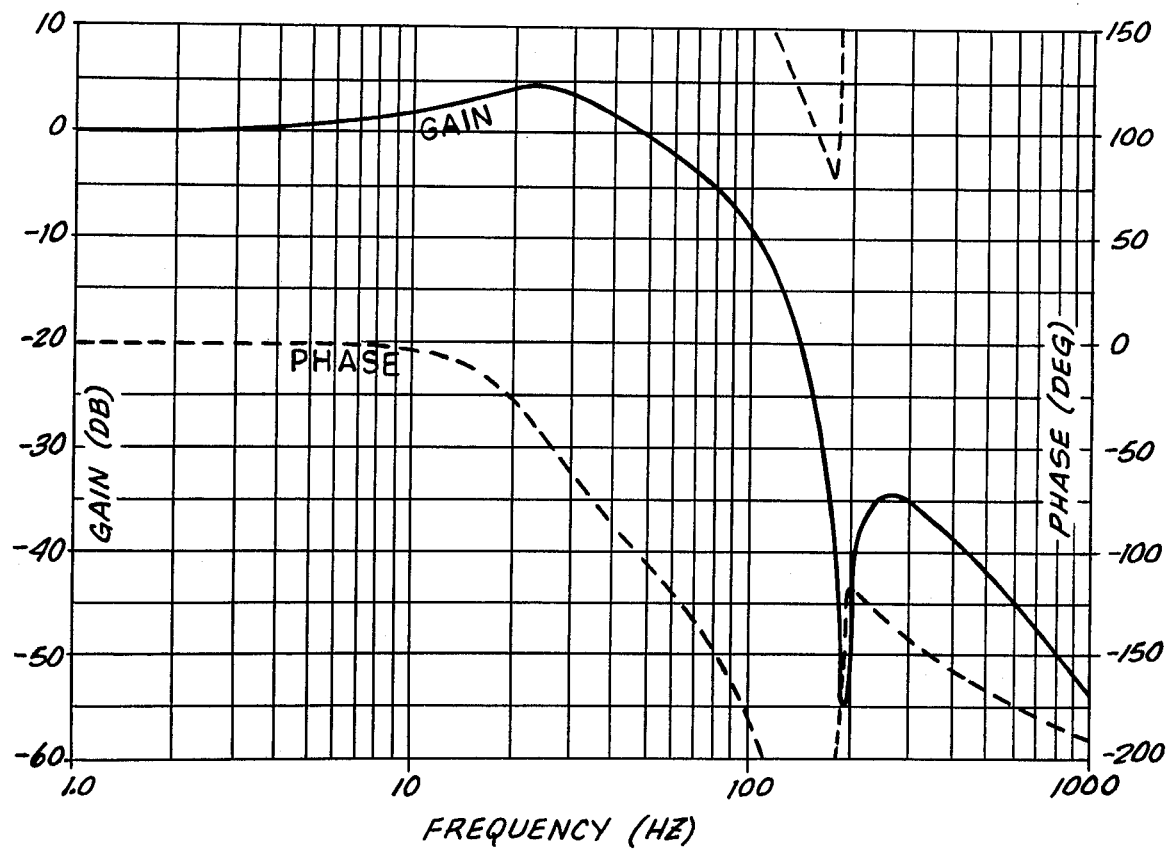
FIG. 6 is a diagram in the form of a Bode plot showing the closed loop performance of circuitry of the present invention.

FIG. 6 is a Bode plot for the closed loop performance of circuitry of FIGS. 2 and 3 incorporated with the gyro to the right of the line 12 in FIG. 1. This plot is developed by applying a rate signal to the gyro and measuring the output that results.

As a result of the present invention, a satisfactory but substantially simplified caging loop system is provided for the specific Teledyne SDG-5 two-degree-of-freedom dry tuned rotor gyro which is effective for controlling the gyros in a strapdown navigation system. The need for complex shaping circuitry heretofore required in such applications of the gyro has been obviated by the present invention.

Although there has been described above a specific arrangement of a gyro caging loop system in accordance with the invention for the purpose of illustrating the manner in which the invention may be used to advantage, it will be appreciated that the invention is not limited thereto. Accordingly, any and all modifications, variations, or equivalent arrangements which may occur to those skilled in the art should be considered to be within the scope of the invention as defined in the appended claims.

What is claimed is:

1. A caging loop system for a gyro having two orthogonal axes, the caging loop system having a cross feed shaping network without any direct feed network, comprising:
    demodulator means;
    means for applying gyro pickoff signals to the demodulator means;
    circuit means coupled to the demodulator means and having an output for applying signals to drive to gyro, the circuit means including an integrator; a predetermined lead-lag network intercoupled with the integrator to develop a complex zero and a complex pole at preselected frequencies, the frequency of the complex zero being lower than the frequency of the complex pole; and a complex second-order lag network coupled to the output of the integrator and providing a pair of complex zeros and a pair of complex poles at selected frequencies determined in accordance with the nutation resonance frequency of the gyro, the complex poles being at a frequency below said nutation resonance frequency and the complex zeros being at a frequency above said nutation resonance frequency.

2. The system of claim 1 wherein the frequency of said pair of complex zeros is between the nutation resonance frequency and twice the spin speed of the gyro.

3. The system of claim 1 wherein said circuit means is a cross feed shaping network having a Laplace transfer function ($F_c$) corresponding to the following equation:

$$F_c = \frac{125(1+S/2\pi(15.8))[1+2(.01)S/2\pi(185)+S^2/4\pi^2(185)^2]}{S(1+S/2\pi(108.9))[1+2(.35)S/2\pi(150)+S^2/4\pi^2(150)^2]} \ V/V.$$

4. The system of claim 1 further including a caging switch coupled in series between the demodulating means and the circuit means.

5. The system of claim 1 wherein the demodulator means comprises first and second demodulators coupled to first and second gyro axes and wherein the circuit means constitutes a first cross feed network coupled between the first demodulator and the second gyro axis and further including a second cross feed network identical to the first cross feed network and coupled between the second demodulator and the first axis of the gyro.

6. The system of claim 1 wherein the second-order lag network comprises a plurality of resistors and a plurality of capacitors intercoupled in a circuit arrangement and selected to produce a phase lag of approximately 180° at the nutation resonance frequency of the gyro to develop phase stability at said nutation resonance frequency.

7. A signal shaping circuit comprising:
    an integrator having an amplifier for receiving signals at an input thereof; and
    a feedback loop including a first capacitor in series with a parallel combination of a resistor and a second capacitor, said resistor and said first and second capacitors constituting a lead-lag network and having values such that the network develops, with said amplifier, a Laplace transform function having a complex pole and a complex zero, the zero being at a lower frequency than the pole.

8. The circuit of claim 7 wherein said zero is at approximately 15.8 Hz and said pole is at approximately 108.9 Hz.

9. The circuit of claim 7 further comprising additional resistors and capacitors interconnected in a complex lag network coupled to the integrator output for further shaping signals received by the amplifier, the additional resistors and capacitors being of values such that the lag network develops a second order Laplace transfer function having a pair of complex zeros and a pair of complex poles, the zeros being at a frequency greater than the frequency of the poles.

10. The circuit of claim 9 wherein the circuit is associated with a device having a fixed nutation resonance frequency, and wherein the frequencies of the complex zeros and complex poles of the second order Laplace transfer function fall on opposite sides of the nutation resonance frequency.

11. The circuit of claim 9 wherein the Laplace transfer function ($F_c$) thereof corresponds to the following equation:

$$F_c = \frac{125(1+S/2\pi(15.8))[1+2(.01)S/2\pi(185)+S^2/4\pi^2(185)^2]}{S(1+S/2\pi(108.9))[1+2(.35)S/2\pi(150)+S^2/4\pi^2(150)^2]} \; V/V.$$

12. The circuit of claim 11 wherein the second order complex zeros are at a frequency of approximately 185 Hz and the second order complex poles are at a frequency of approximately 150 Hz.

13. The circuit of claim 12 wherein the complex zeros damping factor is equal to 0.01 and the complex poles damping factor is equal to 0.35.

14. The circuit of claim 9 wherein the values of the circuit components are such as to satisfy the Nyquist theory stability criterion over a frequency range of at least 10 to 200 Hz.

* * * * *